United States Patent [19]

Hinkle et al.

[11] 4,258,550

[45] Mar. 31, 1981

[54] ENGINE CHARGING SYSTEM WITH DUAL FUNCTION CHARGE SUPPLYING AND CHARGE COOLING BLOWER

[75] Inventors: Stanley J. Hinkle, Union Lake; Dean M. Dildine, Birmingham, both of Mich.

[73] Assignee: General Motors Corporation, Detroit, Mich.

[21] Appl. No.: 47,012

[22] Filed: Jun. 11, 1979

[51] Int. Cl.³ .................... F02B 29/04; F02B 37/04
[52] U.S. Cl. .................................... 60/599; 60/609
[58] Field of Search ............... 60/599, 609, 610, 612; 123/119 CD

[56] References Cited

U.S. PATENT DOCUMENTS

| | | | |
|---|---|---|---|
| 3,143,103 | 8/1964 | Zuhn | 60/599 X |
| 3,921,403 | 11/1975 | McInerney et al. | 60/599 X |

FOREIGN PATENT DOCUMENTS 1003505  2/1957  Fed. Rep. of Germany ............ 60/599

Primary Examiner—Michael Koczo, Jr.
Attorney, Agent, or Firm—Robert J. Outland

[57] ABSTRACT

A two-stroke cycle turbocharged internal combustion engine is provided with a dual core after-cooler and a dual function positively driven blower which at low engine loads is connected to provide necessary charging air to the engine air intake preferably through the inlet of the turbocharger compressor. During periods of high-load operation, when the turbocharger energy is alone sufficient to provide the engine inlet charge, the blower is reconnected to direct cooling air through the aftercooler system thus lowering the temperature of the inlet charge under high-load conditions. Numerous variations and modifications of the concept are disclosed.

7 Claims, 3 Drawing Figures

ENGINE CHARGING SYSTEM WITH DUAL FUNCTION CHARGE SUPPLYING AND CHARGE COOLING BLOWER

TECHNICAL FIELD

This invention relates to internal combustion engines and more particularly to engines, such as turbocharged two-stroke cycle engines, wherein supplemental blower means are provided for charging the engine during certain low load operating conditions. In its more particular aspects the invention relates to aftercooled turbocharged engines provided with a dual function positively driven blower connected to supply charging air to the engine inlet under low load conditions and alternately to provide cooling air to the aftercooling system under high load conditions.

BACKGROUND OF THE INVENTION

In engines of the well known four-stroke cycle piston type the engine pistons have the dual function of pumping the charging air into and out of the engine cylinders as well as providing the required functions of compressing the charge and expanding the burned gases to produce power. There are, however, other forms of internal combustion engines wherein the pistons or other expansible chamber elements, are utilized solely to compress and expand the working gases and supplemental means are provided to charge and scavenge the cylinders. Common examples are piston type two-stroke cycle internal combustion engines which are usually provided with some form of charging air blower, commonly driven directly by the engine.

Two-stroke cycle engines may be turbocharged and provided with aftercooling means for cooling the inlet charge after compression. This is especially common with diesel engines. Usually the turbocharging arrangements for such engines provide adequate energy to supply the full air charge required for operation at the higher load end of the engine operating range. However, some supplemental means for providing charging air for starting and low load operation may be required. Such means may take the form of mechanical or other devices for supplementing the turbocharger drive when the exhaust energy is not sufficient, or it may involve the use of a separate, usually positively driven, blower connected in series with the turbocharger compressor so as to supply adequate induction air to the engine under all operating conditions where the exhaust energy is not sufficient to provide the required charge.

One form of aftercooled, turbocharged two-cycle diesel engine having an engine driven supplemental charging blower in series with the turbocharger is shown in U.S. Pat. No. 4,028,892 Hinkle, granted June 14, 1977 to the assignee of the present invention. Many other exemplary arrangements of turbocharged internal combustion engines having positively driven blower means for supplemental air charging are also known in the prior art.

SUMMARY OF THE INVENTION

The present invention provides an improved form of turbocharged aftercooled internal combustion engine, preferably of the two-stroke cycle type, wherein there is provided a positively driven blower and means for connecting the blower, in a first mode of operation, to provide charging air to the engine during operating conditions in which the turbocharger energy is not sufficient to supply the required air. Means are also provided to connect the blower, in a second mode of operation, to provide cooling air to the induction aftercooling system for cooling the inlet charge under higher load engine operating conditions when the turbocharger energy is adequate to supply the required charging air.

Various additional features may be incorporated in engines according to the invention and numerous variations in engine arrangements are possible as will be apparent from the following description of certain preferred and alternative embodiments taken together with the accompanying drawings.

BEST MODES FOR CARRYING OUT THE INVENTION

Figure 1:
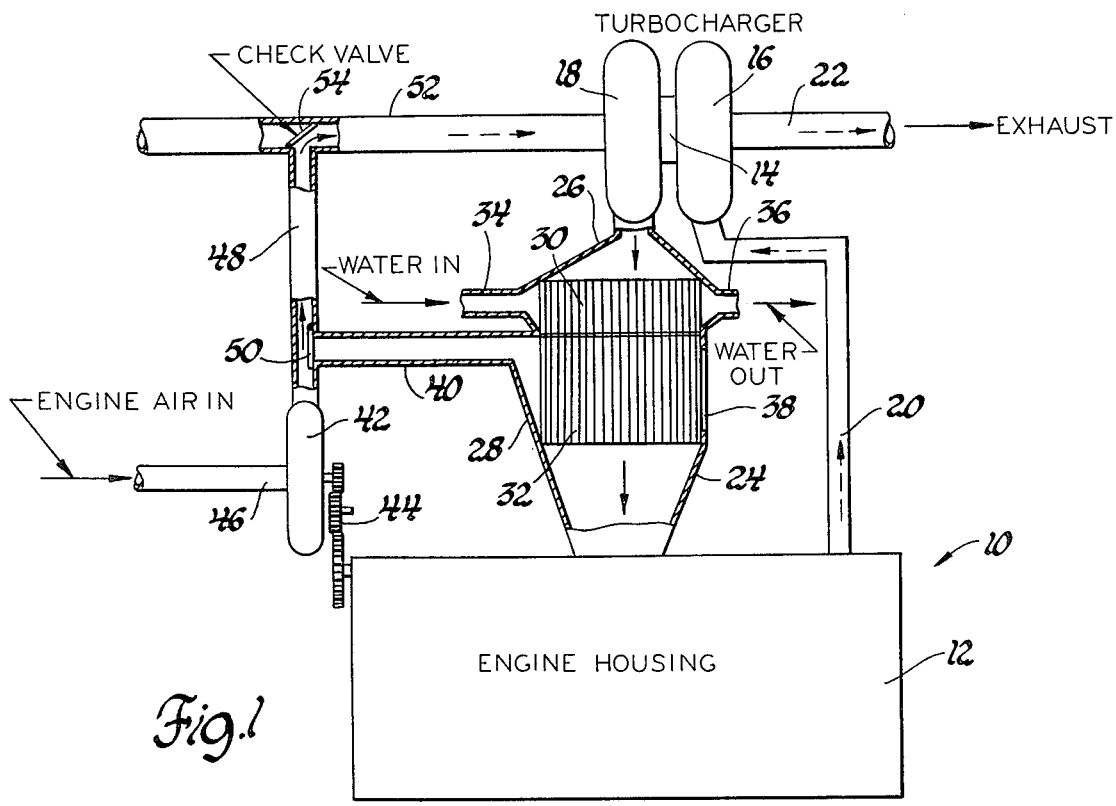
FIG. 1 is a schematic view of a turbocharged two-stroke cycle internal combustion engine having air and water aftercooling and a dual purpose engine-driven charging air blower in accordance with the invention.

Referring first to FIG. 1 of the drawings, there is shown a two-stroke cycle turbocharged and aftercooled internal combustion engine generally indicated by numeral 10. Engine 10 includes a main housing 12 of any suitable construction having cylinders and pistons or other expansible chamber devices not shown arranged to operate on a two-stroke cycle.

Connected with and preferably mounted on the engine housing is an induction and exhaust system including a turbocharger 14 having the usual turbine and compressor sections 16, 18 respectively. Turbine 16 is connected with the engine exhaust outlet by an exhaust conduit 20 through which exhaust gases are passed from the engine for driving the turbine. The spent gases are disposed of through an exhaust pipe 22.

The compressor 18 is driven by the turbine and has an outlet connected through an aftercooler housing 24 with an engine cylinder inlet not shown, through which compressed charges are delivered from the turbocharger to the engine cylinders. The aftercooler housing defines upper and lower sections 26, 28 respectively in which are located separate upper and lower heat exchanger cores 30, 32 respectively. Cores 30 and 32 are arranged on the induction system side so as to provide for the passage of air from the turbocharger compressor through both cores in series before delivery to the engine cylinders.

Cooling for the upper core 30 is provided through an engine water inlet 34 which directs engine cooling water into transverse core passages not shown which extend in heat exchange relationship with vertical induction air passages also formed in the core. The cooling water passes horizontally through the core 30 and out through a water outlet 36 formed on the other side of the housing upper section 26 and connected with the remainder of the engine cooling system not shown.

The lower core 32 also includes transverse passages not shown which connect with an opening 38 in the right side of the housing 24 as shown in the drawing and a conduit 40 connecting with the left side of the core as shown in the drawing for the purpose of passing air through the core in heat exchange relation with the vertical induction air passages also extending through the core.

In accordance with the invention the engine is also provided with a dual function air blower or pump 42 which may be of any suitable form for the particular engine application and in this instance is indicated as being of the centrifugal impeller type. Blower 42 is positively driven by the engine through a gear train 44 and is connected with an air intake conduit 46 and an outlet conduit 48. Conduit 48 connects intermediate its ends with one end of the heat exchanger conduit 40, communication with which is controlled by a valve 50 shown in the closed position. At its end conduit 48 also connects with a compressor inlet conduit 52, communication with which is controlled by a second valve 54 having the form of a check valve and shown in the open position.

In operation, upon starting and low-speed running of the engine, valves 50 and 54 are in the positions shown in FIG. 1. As the blower 42 is rotated by operation of the engine through the gear train 44, it draws air in through conduit 46 and forces it out through conduit 48 into the compressor inlet conduit 52. This conduit directs the inlet air to the turbocharger compressor 18, from which it passes through the aftercooler housing 24 to the engine cylinders, thus providing charging air to the engine.

Under idling and low power engine operating conditions, the exhaust energy available in the engine exhaust gases delivered to the turbocharger is not adequate to operate the turbocharger at a speed that will provide enough charging air for operating the engine. Thus operation of the blower 42 is required in order to provide an adequate air charge under these conditions. To the extent exhaust energy is available, however, the charge of air supplied to the engine is further compressed by operation of the turbocharger. Also, if the induction air is heated by compression above the temperature of the engine cooling water, the compressed induction air is cooled somewhat as it passes through the air side of the upper air to water heat exchanger core 30. Passage through the lower air to air heat exchanger core 32 has no effect in this mode of operation, however, since no cooling air flows through this core under the conditions described.

When the engine operating load is increased to the point where the exhaust energy available to the turbocharger is sufficient to provide an adequate charge of air without the assistance of the blower 42, the system may be reconnected through manual or automatic means not shown so as to move the valve 50 to its open position, thus cutting off the flow of air from the blower 42 to the inlet conduit 52 and instead, directing the air to the aftercooler conduit 40 for passage through the aftercooler core 32. When flow through the upper portion of the outlet conduit 48 is cut off, the check valve 54 automatically closes, permitting the turbocharger to take air in directly in through the outer end of conduit 52 and to compress and direct this induction air through the aftercooler cores 30, 32 to the engine combustion chambers.

In this mode of high engine power operation, the highly compressed charging air is initially cooled by passage through the air to water heat exchanger core 30 to a temperature somewhat above the temperature of the engine cooling water passing through the core. Subsequently, passage through the air to air heat exchanger core 32 further cools the induction air to a temperature somewhat above that of the blower supplied cooling air passing through the core from the blower 42 to the conduit 40 and out through the opening 38 in the aftercooler housing.

With the described arrangement it is apparent that an efficient air charge compression and cooling system has been provided by the arrangement of the dual cooling cores and further by the dual purpose operation of blower 42 to (1) supply charging air directly to the engine during low power operation when the turbocharger is unable to supply adequate air and (2) to pass cooling air through the air to air aftercooler core under conditions of high output operation when the turbocharger supplies air to the engine under highly compressed and highly heated conditions so as to provide added aftercooling to the induction air and obtain a further reduction in inlet air temperature below that which could be provided by an engine water cooled aftercooler core acting alone. Thus the dual function blower 42 is utilized in a manner to improve the engine operation by lowering the charge temperature under high-power conditions while additionally operating to provide necessary charging air under engine low power, idle and starting operating conditions.

Figure 2:
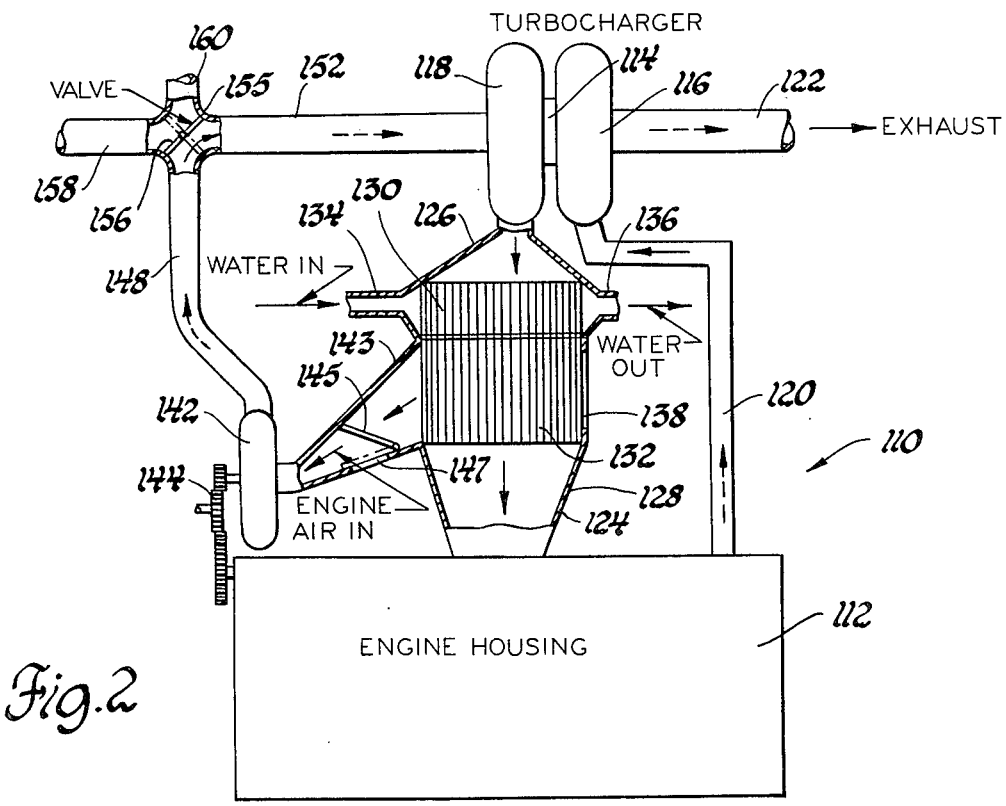
FIG. 2 is a schematic view similar to FIG. 1 but showing a modified form of engine in accordance with the invention.

Referring now to FIG. 2 of the drawings, there is shown another embodiment of turbocharged aftercooled two-stroke cycle internal combustion engine formed in accordance with the invention and generally indicated by numeral 110. Since the major components of the arrangement of FIG. 2 are the same as or similar to those of the arrangement of FIG. 1, such components are identified by numerals 100 greater than those of the similar components of the arrangement of FIG. 1 and no further description of them is believed required.

The embodiment of FIG. 2 differs from that of FIG. 1 in the following aspects. The blower 142 has its inlet connected with a conduit 143 connecting with the left side of the lower air to air heat exchanger core 132, which in this case is the air outlet side of the core. The opening 138 in the right side of housing 124 forms the inlet for the cooling air in the FIG. 2 arrangement. A valve 145 mounted within the conduit 143 is movable to a closed position as shown which blocks the flow of air through the core 132 but opens the conduit to air flow through an opening 147 in the lower wall of conduit 143 to provide ambient air directly to the intake of the blower 142. Movement of the valve 145 to its alternate position shown in phantom lines blocks air flow through the opening 147 and opens the conduit 143 to air flow through the opening 138 and aftercooler core 132 to the intake of the blower 142.

Another difference in the construction of the FIG. 2 embodiment is the cross-like intersection of the blower outlet conduit 148 with the turbocharger compressor inlet conduit 152 at a junction 155 provided with a manually or automatically actuated valve 156. Valve 156 is movable between a first position as shown in the drawing in which the outlet flow from the blower 142 is directed through conduit 152 to the inlet of the turbocharger. An alternate position of valve 156 shown in phantom lines is also provided wherein the outlet flow from the blower 142 is directed into an outlet fitting 158 for passage to atmosphere while the compressor inlet conduit 152 is connected with an inlet fitting 160 from which the turbocharger may draw in ambient air.

In operation of the embodiment of FIG. 2 the valves are arranged as shown in the drawing for starting and for operation at idle and low load conditions wherein the turbocharger is not supplied with sufficient energy to provide an adequate air charge to the engine. In this mode of operation, the gear driven blower 142 draws induction air through the opening 147 into its inlet and discharges through conduits 148 and 152 to the turbocharger compressor inlet. From this point induction air passes through the turbocharger compressor 118 and the aftercooler housing 124 to the engine cylinders with the same essential mode of operation and advantages found in the first described embodiment.

When the engine power is increased to the point where the energy supplied to the turbocharger is sufficient to provide an adequate air supply to the engine without the supplementing flow of air from blower 142, the valves 145 and 156 are moved to their alternate positions as shown in phantom lines in FIG. 2. In this operating mode, the turbocharger compressor draws air directly from the inlet fitting 160 through conduit 152 to the compressor where it is compressed and directed through the aftercooler cores in housing 124 and thence to the engine cylinders. The compressed air is, as in the previously described embodiment, initially cooled by engine water passing through the upper heat exchanger core 130. Secondarily, however, blower 142 provides a flow of air drawn through the inlet opening 138 and the aftercooler core 132 exiting through conduit 143 to the blower 142 from which it is discharged through conduit 148 and outlet fitting 158 to atmosphere.

This mode of operation provides essentially the advantages of the second mode of operation of the first described embodiment. One further advantage, however, is that the cooling air passed through the lower heat exchanger core 132 enters the core at essentially ambient temperature, since it is not compressed by first passing through the blower as in the arrangement of the embodiment of FIG. 1. In other ways the operating advantages of the two systems are essentially identical.

Figure 3:
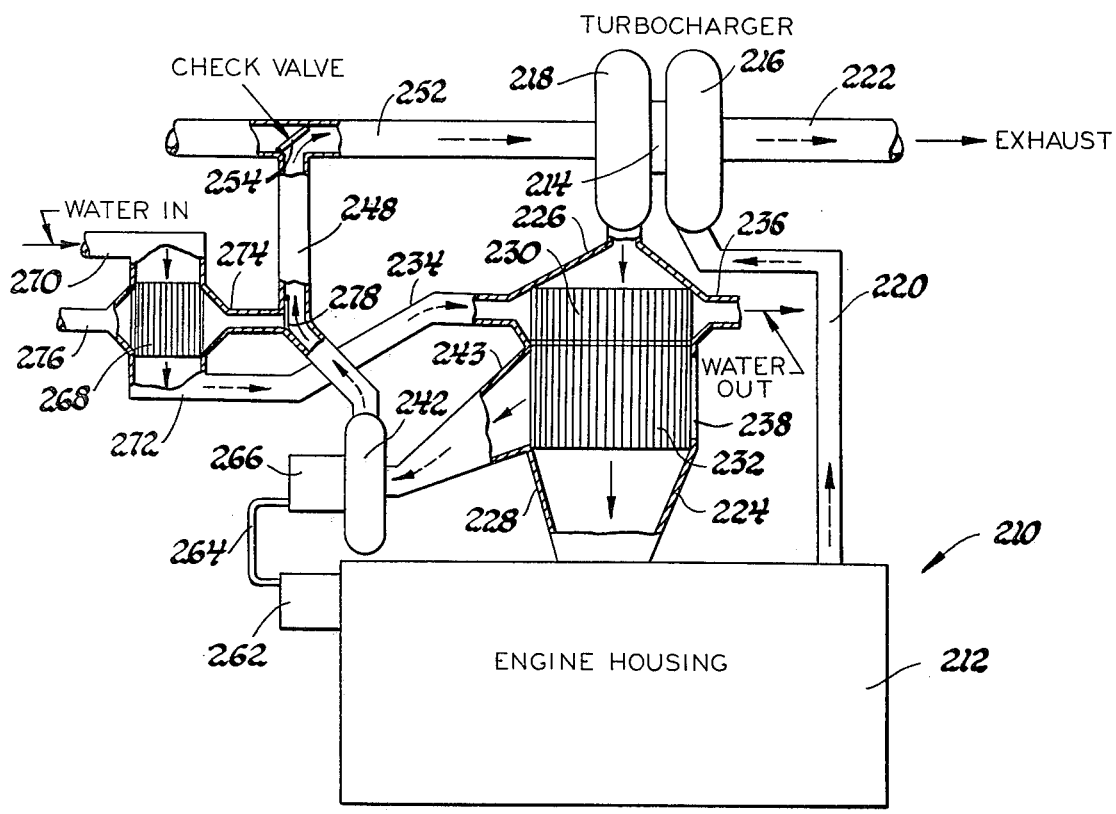
FIG. 3 is a schematic view similar to FIGS. 1 and 2 but showing yet another arrangement for an engine formed in accordance with the invention.

Referring now to FIG. 3 of the drawings there is shown a third embodiment of two-stroke cycle turbocharged and aftercooled internal combustion engine formed in accordance with the principles of the invention and generally indicated by numeral 210. To avoid unnecessary description components of the FIG. 3 embodiment which are similar to the embodiment of FIG. 2 are identified with numerals 100 higher than those of the FIG. 2 embodiment.

Differences in the arrangement of FIG. 3 from that of the FIG. 2 embodiment are as follows. Blower 242 instead of being driven by a gear train is positively driven by a hydraulic pump 262 connected by suitable hydraulic lines 264 with a hydraulic motor 266 directly connected with the blower. The pump and/or the motor may be arranged for variable displacement so that the blower speed may be varied with respect to the engine speed if desired, or a direct speed relationship may be retained.

While the blower takes in air from a conduit 243 connected to the outlet side of the lower heat exchanger core 232 as in the embodiment of FIG. 2, the valving arrangement of FIG. 2 is not utilized and there is no air inlet opening on the lower side of conduit 243. It should be understood, however, that such an arrangement could be utilized in the arrangement of FIG. 3 if desired.

Another feature of the FIG. 3 arrangement is the provision of an additional water to air heat exchanger core 268 which has an inlet connection 270 connected with the engine cooling system to receive engine cooling water, which is directed through the core 268 to an outlet 272 connected with the inlet conduit 234 that directs water to the inlet of the upper heat exchanger core 230. The coolant passages of heat exchanger core 268 are in heat exchange relation to horizontal air passages not shown which may be supplied with air through an inlet fitting 274 that connects with the blower outlet conduit 248. An outlet fitting 276 is provided for exhausting the cooling air from the core 268 to atmosphere.

A valve 278 is provided in conduit 248 which, in a first position shown, blocks the end of inlet fitting 274 and directs blower outlet air through conduit 248 to the inlet conduit 252 of the turbocharger compressor 218. A check valve 254 is opened as shown to permit the flow of air as in the embodiment of FIG. 1. In this operating mode blower 242 provides charging air to the engine cylinders during periods when the engine turbocharger energy is insufficient for such purpose.

When turbocharger energy rises during operation at relatively high engine outputs, the valve 278 is moved to a second position wherein the flow of blower air to the turbocharger inlet is cut off and is instead directed through the third heat exchanger core 268. In this mode of operation the check valve 254 closes and ambient air is drawn in directly to the turbocharger inlet for compression and passing through the two aftercooler cores 230, 232 to the engine cylinders.

As in the first and second embodiments, this operating mode provides dual cooling stages for the induction air which passes first through the upper core 230 where the air is cooled to a temperature somewhat above that of the engine coolant supplied to the core and then passes through the lower core 232 where the induction air is cooled to a lower temperature somewhat above that of ambient by the passage of the ambient cooling air through the core toward the blower inlet. The arrangement of FIG. 3 also provides a further cooling function in this operating mode by directing the exhausted blower air through the third heat exchanger core 268, where the air cools to some extent the incoming engine coolant which is then directed to the inlet of the upper aftercooler core 230. Thus, under certain conditions, the water temperature of the upper core is reduced and the cooling effect of the aftercooler is enhanced.

While three specific embodiments of engine aftercooler arrangements with dual function blowers have been disclosed, it should be recognized that numerous additional modifications and variations could be provided in systems of this sort without departing from the scope of the inventive concepts disclosed.

As an example and without limitation, it would be possible to substitute for the lower aftercooler core in any of the arrangements a water to water heat exchanger with cooling water to the core being provided by a separate cooling system operating at a lower temperature than the engine cooling water system. If desired, a water to air heat exchanger could be provided in this second cooling system through which cooling air could be directed by the engine driven blower for cooling the aftercooler core indirectly rather than directly as in the illustrated embodiments. Such an arrangement might have the advantage of providing a more compact aftercooler core arrangement for an equivalent cooling capacity.

Alternatively, it would be possible to provide other means for driving the blower either directly from the engine or in an indirect manner such as through an electric motor at a constant or variable speed. Since these and other variations of the disclosed concepts are possible within contemplation of the invention it is intended that the invention not be limited to the disclosed embodiments but that it have the full scope permitted by the language of the following claims.

The embodiments of the invention in which an exclusive property or privilege is claimed are defined as follows:

1. The combination in a turbocharged and aftercooled two-stroke cycle internal combustion engine of a positively driven air blower, first means connecting the blower to the turbocharger in a first operational mode for supplying engine charging air during periods of relatively low engine load when the exhaust energy is inadequate to drive the turbocharger at a speed sufficient for it to provide an adequate air supply and second means to connect the blower with the aftercooler to cool the inlet charge in a second operational mode during periods of relatively high engine load when the exhaust energy is adequate to drive the turbocharger at a speed sufficient to sustain engine operation without a supplemental air charge requirement.

2. In combination,
    a two-stroke cycle internal combustion engine having an air intake, an exhaust outlet and an air charging system for supplying combustion and scavenging air to the air intake, said air charging system comprising
    a turbocharger including a turbine connected with the engine exhaust outlet for driving the turbine with engine exhaust gases and a compressor driven by the turbine and connected with the engine air intake to supply air thereto, at least during relatively high load conditions of engine operation in which adequate exhaust energy is available for driving the turbocharger,
    a heat exchanger connected between the turbocharger compressor and the engine air intake to remove heat from the compressor supplied engine intake air,
    a positively driven blower,
    first duct means connecting the blower with the heat exchanger at least during portions of said high load engine operation, to pass cooling air through the heat exchanger, and
    second duct means connecting the blower with the turbocharger compressor at least during predetermined periods of relatively low load engine operation to supply charging and scavenging air to the engine when the exhaust energy is inadequate to drive the turbocharger at a speed necessary to provide an adequate air supply.

3. In combination,
    a two-stroke cycle internal combustion engine having an air intake, an exhaust outlet and an air charging system for supplying combustion and scavenging air to the air intake, said air charging system comprising
    a turbocharger including a turbine connected with the engine exhaust outlet for driving the turbine with engine exhaust gases and a compressor driven by the turbine and connected with the engine air intake to supply air thereto at least during relatively high load conditions of engine operation in which adequate exhaust energy is available for driving the turbocharger,
    an air to air heat exchanger connected between the turbocharger compressor and the engine air intake to remove heat from the intake air supplied by the compressor to the engine,
    an engine driven blower,
    first duct means connecting the blower with the heat exchanger, at least during portions of said relatively high load engine operation, to pass cooling air through the heat exchanger, and
    second duct means connecting the blower with the turbocharger compressor, at least during predetermined periods of relatively low load engine operation, to supply charging and scavenging air to the engine air intake when the engine exhaust energy is inadequate to drive the turbocharger so as to alone provide a sufficient air supply to the engine.

4. The combination of claim 3 and further comprising an air to liquid primary heat exchanger having its air side connected between the turbocharger compressor and the air to air heat exchanger, the liquid side of the primary heat exchanger being connected with a source of liquid coolant to provide for initial removal of heat from the compressor supplied engine intake air before the intake air is passed through the air to air heat exchanger for secondary heat removal.

5. The combination of claim 4 wherein said source of liquid coolant is the liquid cooling system of the engine.

6. In combination
    a two-stroke cycle internal combustion engine having an air intake, an exhaust outlet and an air charging system for supplying combustion and scavenging air to the air intake, said air charging system comprising
    a turbocharger including a turbine connected with the engine exhaust outlet for driving the turbine with engine exhaust gases and a compressor driven by the turbine and connected with the engine air intake to supply air thereto,
    an air to air heat exchanger connected between the turbocharger compressor and the engine air intake to remove heat from the intake air supplied to the engine,
    an engine driven blower,
    means connecting said blower with both said turbocharger compressor to supply air to the engine air intake and with said heat exchanger to supply cooling air thereto for removing heat from the engine intake air, and
    air flow control means in said connecting means and operable in a first position to direct blower air to the compressor while blocking the flow of ambient air to the compressor and the flow of blower air to the heat exchanger, said control means being operable in a second position to direct blower air to the heat exchanger while blocking the flow of blower air to the compressor and permitting the flow of ambient air to the compressor.

7. The combination of claim 6 wherein said engine has a liquid cooling system and said air charging system further comprises an air to liquid heat exchanger having its air side connected between the turbocharger and the air to air heat exchanger and its liquid side connected to the engine liquid cooling system to utilize the engine coolant for primary cooling of the compressor supplied intake air.

* * * * *